UNITED STATES PATENT OFFICE.

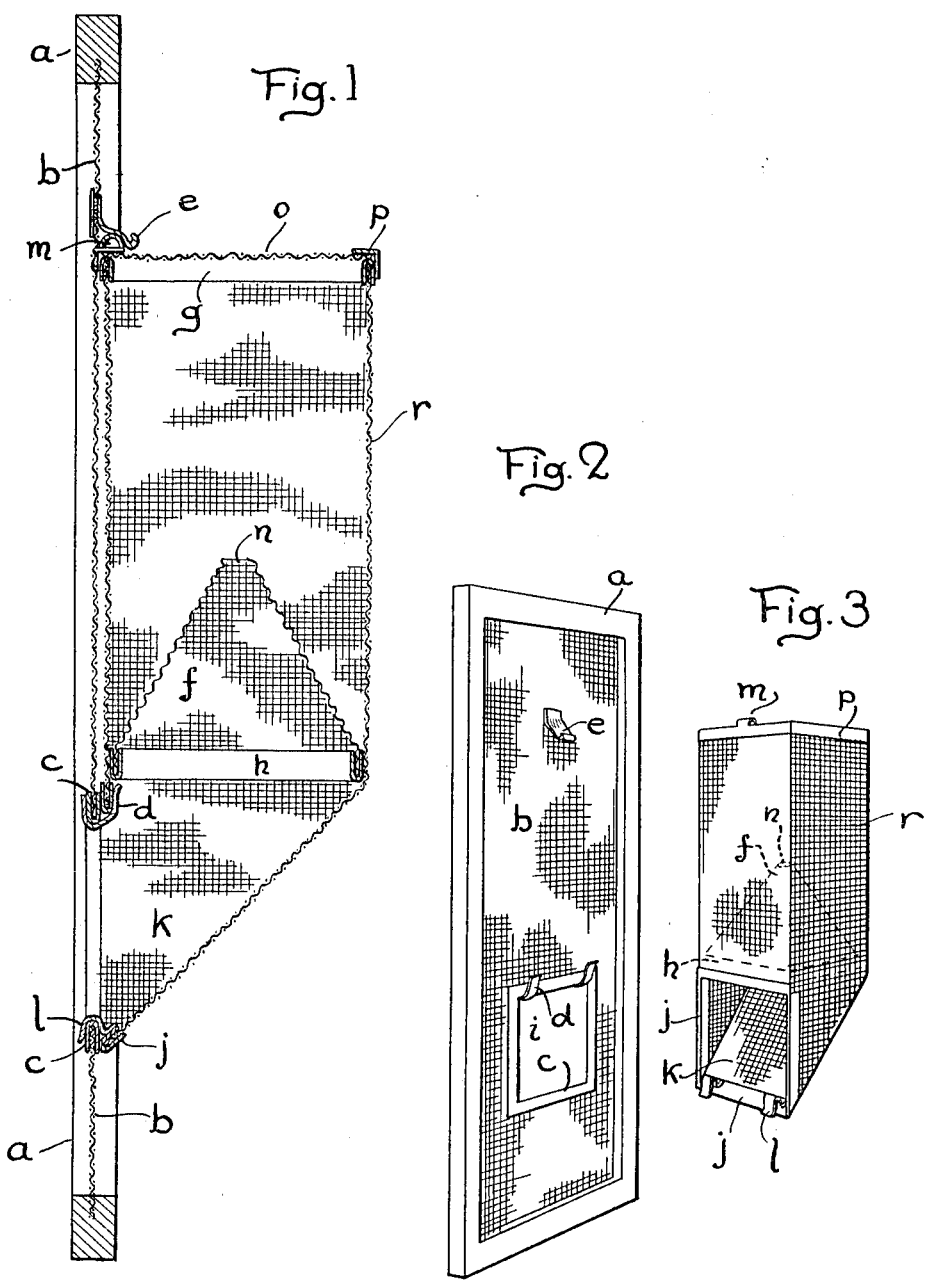

CARL G. MILLER, OF MOUNT CLEMENS, MICHIGAN.

FLY-TRAP.

1,073,811.   Specification of Letters Patent.   Patented Sept. 23, 1913.

Application filed April 24, 1913. Serial No. 763,261.

*To all whom it may concern:*

Be it known that I, CARL G. MILLER, a citizen of the United States, residing at Mount Clemens, county of Macomb, State of Michigan, have invented a certain new and useful Improvement in Fly-Traps, and declare the following to be a full, clear, and exact description of the same, such as will enable others skilled in the art to which it pertains to make and use the same, reference being had to the accompanying drawings, which form a part of this specification.

This invention relates to fly traps and has for its object a special form of screen fly trap which is removably secured to the screen by means which are believed to be novel and which make its detachability a matter of ease.

In the drawings:—Figure 1, is a section of the screen and the fly trap attached thereto. Fig. 2, is a perspective of the screen showing the trap-securing means thereupon. Fig. 3, is a perspective of a fly trap shown in relation to the screen of Fig. 2, in position to be attached.

The screen frame is indicated by the letter $a$ and this holds a wire screen $b$. This wire screen has a rectangular opening in the lower half of the screen which is protected by a metal strip $c$, which extends completely around the opening and serves to confine the cut ends of the wires. Fastened to the top portion of this strip $c$ are a pair of spring clips $d$ which are fastened to the strip $c$ on the inside and protrude outside presenting their resilient free ends. In the upper half of the screen near the top a spring catch $e$ is fastened to the wire screen.

The trap itself is made almost completely of screen wire and is indicated as $r$ in the drawings. It contains a substantially rectangular trapping chamber into which protrudes a pyramidal structure of wire screen that may be termed an entrance-guide. The top corners of the rectangular trapping chamber are lined on the outside with a folded strip $g$. A lid $o$ formed by a strip of screen wire and an angle strip $p$ fits over the top and may be removed when the trap is detached from the screen to empty the trap of its contents. The bottom of the rectangular chamber is stiffened on the inside by a folded strip $h$ which holds the ends of the screen wire that forms the pyramidal guide $f$.

The screen wire that forms the trapping chamber is continued down below the folded strip $h$ to form a lead-way to connect the opening $i$ of the screen wire $b$ with the pyramidal guide $f$. A folded strip $j$ covers the frayed wire ends formed at the opening into the lead-way passage $k$. This opening lies in the same plane as the extended side of the trapping chamber. The bottom portion of the folded strip $j$ is provided with a pair of spring clips $l$, whose free and resilient ends protrude outward.

The opening leading into the lead-way passage $k$ is of the same size as the opening $i$ in the screen $b$. The two protecting strips $j$ and $c$ are intended to coincide. The spring clips $l$ fit over the lower portion of the strip $c$ as shown in Fig. 1, while the spring clips $d$ slip inside of the top portion of the strip $j$. The roll $m$ on the lid $o$ can be pushed under the spring catch $e$ and thereby the fly trap will be attached to the screen and it may be quickly removed by reversing the operation already described.

Flies are enticed in the lead-way $k$ and are guided by the entrance-guide $f$ to the apex of the guide which is open as at $n$. Then they enter the trapping chamber where they are caught, for it is almost impossible for them to find the opening $n$ so as to escape.

The main features of this trap are the simplicity of the fastening means and the ease with which the trap may be removed or attached to the screen when it is desired to empty it.

What I claim is:—

The combination with a screen provided with an opening therein, a border strip about said opening, a clip attached to said border strip and having its free and resilient end protruding from the top portion of the strip, and a spring catch attached to the screen above said opening, of a fly trap comprising screen wire forming a trapping chamber, an entrance-guide leading into said trapping chamber and a lead-way leading from the entrance-guide to a plane continuing one side of the trapping chamber, said lead-way having an open end at such plane, a border strip lining said opening, a spring clip attached to the lower portion of said border strip and a roll attached to the top of the fly trap, whereby the spring clip on the fly trap border strip may slip over the lower portion of the border strip of the screen opening and the spring clip of the screen opening may slip over the upper portion of the border strip of the lead-way, while the roll on the top of the fly trap slips under the spring catch near the top of the screen, substantially as described.

In testimony whereof, I sign this specification in the presence of two witnesses.

CARL G. MILLER.

Witnesses:
STUART C. BARNES,
AMELIA C. KOEHN.

Copies of this patent may be obtained for five cents each, by addressing the "Commissioner of Patents, Washington, D. C."